United States Patent [19]
Zimmerman

[11] Patent Number: 4,860,672
[45] Date of Patent: Aug. 29, 1989

[54] TRIP MECHANISM FOR DRILL SEED BOOT

[76] Inventor: Robert Zimmerman, Box 6, Almira, Wash. 99103

[21] Appl. No.: 260,455

[22] Filed: Oct. 20, 1988

Related U.S. Application Data

[63] Continuation of Ser. No. 45,075, Apr. 30, 1987, abandoned.

[51] Int. Cl.$^4$ .............................................. A01C 5/06
[52] U.S. Cl. ..................................... 111/84; 111/151; 111/926; 172/711
[58] Field of Search ..................................... 111/84–86, 111/83, 7, 67, 70; 267/41, 48; 172/711, 710, 705, 270, 233, 269

[56] References Cited

U.S. PATENT DOCUMENTS

| | | | |
|---|---|---|---|
| 7,241 | 4/1850 | Haversticke | 111/86 |
| 48,069 | 6/1865 | Ingels | 172/710 |
| 3,402,773 | 9/1968 | Jennings et al. | 172/269 |

Primary Examiner—Danton D. DeMille
Attorney, Agent, or Firm—Wells, St, John & Roberts

[57] ABSTRACT

A seed drill including depending furrow openers having a lower shovel and a supporting seed boot. Each seed boot is pivotally supported on a longitudinal drag bar assembly connected to it about a transverse pivotal connection. The forwardly extending arm at the upper end of the seed boot selectively engages one end of a longitudinal leaf spring mounted to the drag arm assembly. A preselected planting position for the shovel and seed boot is defined by an overlying adjustable stop. An arcuate abutment surface is interposed between the seed boot arm and leaf spring. A stop is interposed between the drag arm assembly and leaf spring for limiting upward movement of the free spring end.

10 Claims, 3 Drawing Sheets

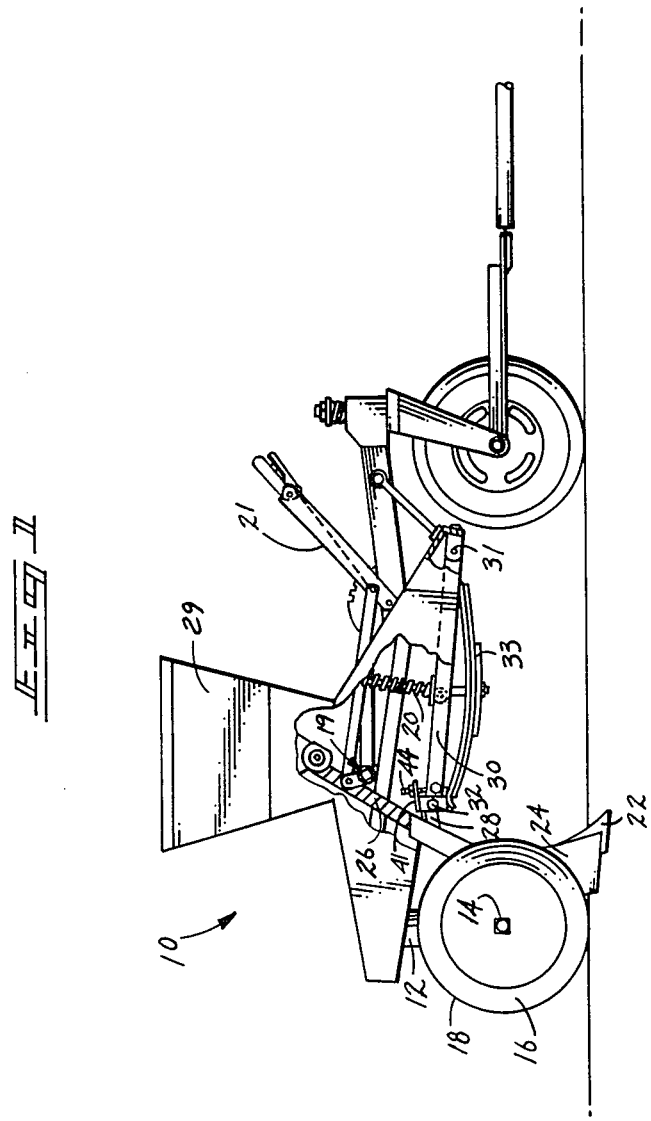

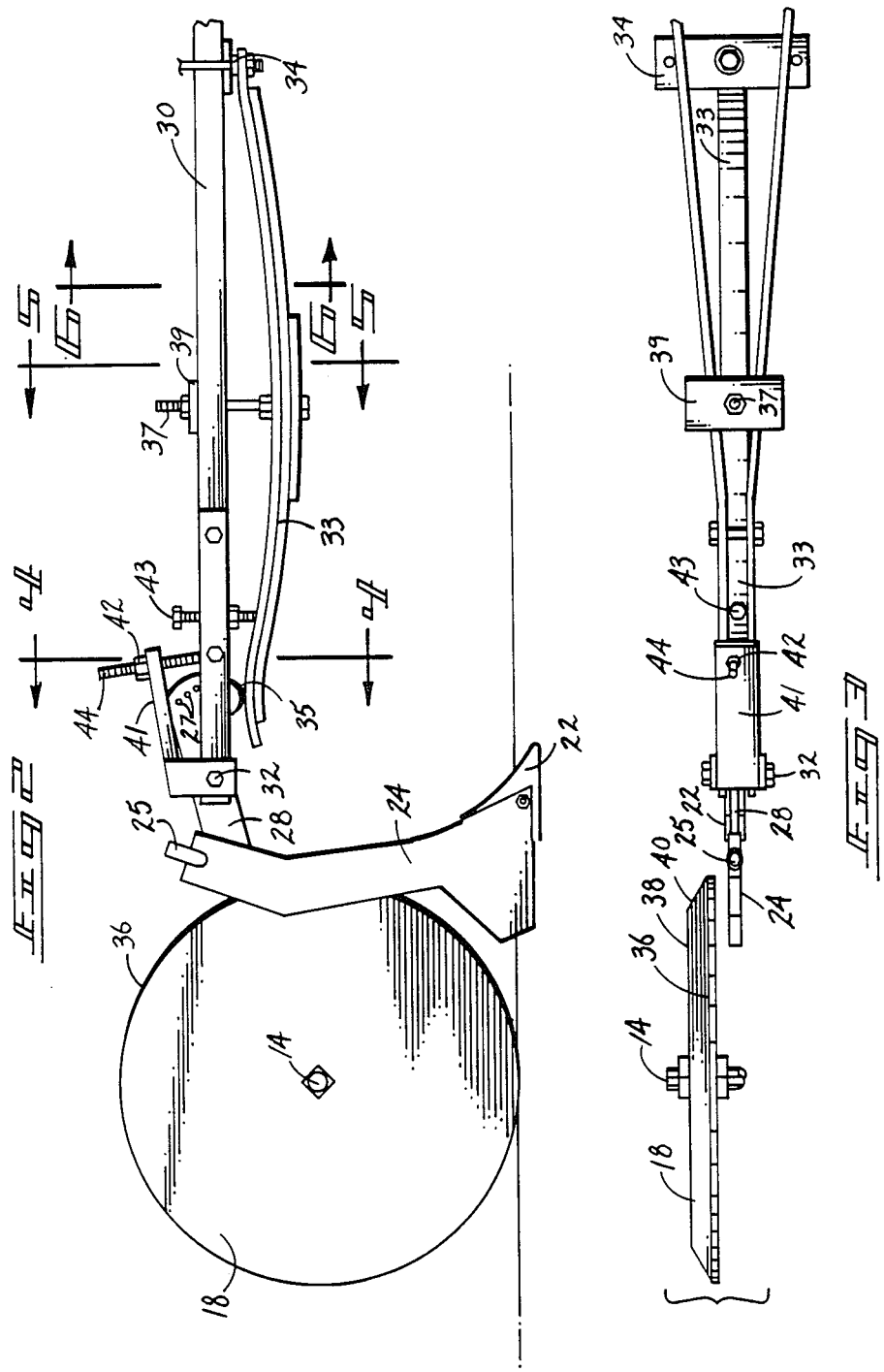

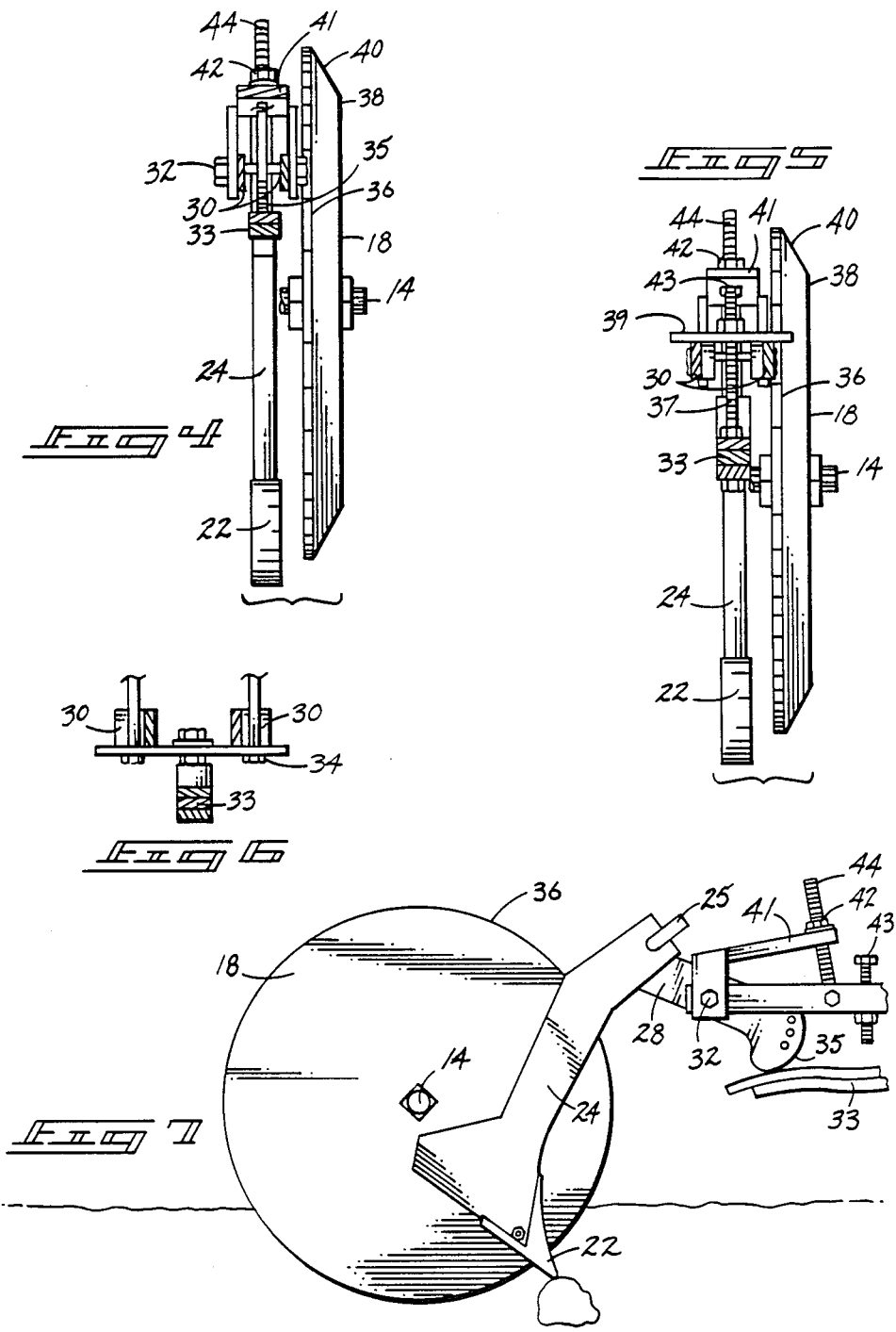

TRIP MECHANISM FOR DRILL SEED BOOT

CROSS REFERENCE TO RELATED APPLICATIONS

This is a continuation of co-pending U.S. patent application Ser. No. 045,075, filed Apr. 30, 1987, now abandoned.

TECHNICAL FIELD

This disclosure pertains to seed drills for agricultural crops such as grain.

BACKGROUND OF THE INVENTION

This invention relates to an improvement in a seed drill of the type disclosed in my U.S. Pat. No. 3,177,830, which was issued on Apr. 13, 1965. A modification of this type of seed drill was disclosed in my U.S. Pat. No. 3,319,590, issued May 16, 1967. The disclosures of these two prior patents are hereby incorporated within this disclosure by reference.

The seed drills disclosed in my referenced U.S. Patents are designed for deep furrow seeding of crops. Seed is planted at the bottom of a furrow having packed sloped sides. This is accomplished by placing the seeds into soil behind a narrow shovel overlapped closely by single or paired press wheels. Each pair of press wheels is mounted alongside the path of a shovel to pack the sloping sides of a deep furrow and assure accurate control of both planting depth of the seeds and soil coverage over the seeds.

When such seed drills are used, the weight of the mobile frame, the negative draft created by the shape of the shovel and interposed compression spring forces cooperatively maintain the shovel at a subsoil elevation to place seeds in moist soil at the bottom of the subsequently-packed furrow sides. The shovels are each fixed at the lower end of a rigid seed boot, which is in turn fixed to the rear end of elongated drag bar assemblies. The drag bar assemblies are transversely pivoted at their forward ends and can be raised or lowered through a spring biased mechanical connection between the mobile frame and the individual drag bar assemblies. While the drag bar assemblies are normally biased downwardly through an interposed compression spring, the elongated moment arm between the forward pivot connections and the rearward shovel minimizes upward movement of the shovel due to soil obstructions. Upward movement is also virtually prevented by the substantial compressive forces needed to assure proper engagement of moist soil by the individual shovels. While my patents mention that the shovels can move upwardly to clear rocks and field obstructions, these statements have been proven overly optimistic in actual practice.

To avoid destruction of shovels and/or supporting seed tubes when engaging an obstruction such as a rock, it has been common to connect the upper end of the seed tube to the rear end of the individual drag bar assemblies through a frictional pivot connection, and to fix them to one another by means of a shear pin that will break before serious damage occurs to the shovel or seed tube. Similar damage to the adjacent press wheels is not a significant problem, since their rolling engagement with the soil permits the press wheels to roll over engaged obstructions.

Since seed drills are commonly used to simultaneously seed parallel rows across a wide field swath by operation of multiple units, the operator of a tractor pulling such drills cannot be always aware of the breakage of individual shear pins. When this occurs, the loosely depending seed boot and shovel will continue to be dragged between the press wheels, but will not effectively place seed as required for planting purposes. This results in skipped areas along intended seed rows and can affect planting efficiency and resulting crop production levels. Furthermore, the breakage of a shear pin, when detected, requires that the entire drill be stopped, the broken pin segments be removed, the seed drill and shovel be manually repositioned, and that a new shear pin be reinstalled between the seed tube and drag bar assembly. This is not only time consuming and difficult under field conditions, but requires the operator to have tools and repair parts always available in order to minimize down time during critical seeding periods.

The present invention arose as part of an effort to improve the efficiency of such seeding operations. It provides an automatic trip mechanism that replaces the shear pin connections and permits the shovel to clear field obstructions by momentarily pivoting rearwardly and then automatically returning to its normal planting position. The entire operation occurs without human intervention during normal forward travel of the drill. It requires no down time or manual repair to the equipment. Further development has refined the mechanism to incorporate adjustment features that permit the user to adapt the drill components to individual field conditions and planting requirements. The otherwise rigid connection that has been used to mount such furrow openers in the past can now mimic the flexible soil engaging operations of a spring tooth shovel, which constantly vibrates back and forth to match soil conditions and facilitate opening of the required furrow. This is particularly advantageous when utilizing this type of drill in minimum or no-till yield operations, where greater soil compactness and soil variations are encountered, as well as varying draft loads due to field trash conditions posed by earlier crop residues.

The automatic trip mechanism utilizes an elongated leaf spring of a type very readily available in automotive and related fields. It can be readily mounted to existing drills or incorporated within the structure of new drills as they are designed and manufactured.

BRIEF DESCRIPTION OF THE DRAWINGS

The preferred embodiment of the invention is illustrated in the accompanying drawings, in which:

FIG. 1 is a side view of the seed drill, with portions of the mobile framework broken away to show support features for the furrow openers;

FIG. 2 is an enlarged side elevation view of the furrow opener and supporting drag arm assembly;

FIG. 3 is an enlarged top view of the apparatus shown in FIG. 2;

FIG. 4 is an enlarged cross-sectional view taken along line 4—4 in FIG. 2;

FIG. 5 is an enlarged cross-sectional view taken along line 5—5 in FIG. 2;

FIG. 6 is an enlarged cross-sectional view taken along line 6—6 in FIG. 2; and

FIG. 7 is a fragmentary side elevation view, showing the rearward elements in FIG. 2 when pivoted from the planting position due to engagement of an obstruction.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The seed drill described in detail below includes a mobile frame 10 and a seed delivery system for directing seeds from a storage hopper 29 to a seed delivery tube 26 having an open lower end. The seeds are typically metered to provide the desired planting density within parallel rows along the field area. Seeds are placed by use of a furrow opener that includes a rigid seed boot 24 and a shovel 22 fixed to the lower end of the seed boot 24. The seed boot 24 has an open upright seed passage extending between its upper and lower ends, the upper end of the seed passage being in communication with the lower end of the seed delivery tube 26. A longitudinal drag bar 30 is connected to the mobile frame 10 about a transverse axis at a forward pivot connection 31. A transverse pivotal connection 32 joins the upper end of the seed boot 24 to the rear end of the drag bar 30 to support the seed boot 24 and shovel 22 for pivotal movement about a transverse axis. A leaf spring 33 is mounted to and extends along the drag bar 30. It operably engages the seed boot 24 to normally bias it forwardly about its transverse pivot connection 32 relative to the drag bar, but is yieldable to permit rearward pivotal movement in response to field conditions encountered by the shovel during forward travel of the seed drill. Further features of the drill include an adjustable stop 41 in the path of movement of the seed boot 24 to define a preselected planting position in which the boot is normally held during field operations. The leaf spring also is adjustable to vary the force normally biasing the seed boot 24 to its preselected planting position.

The terms "forwardly" and "rearwardly" as used in this description shall refer to the intended "forward" direction of travel of the mobile frame 10 and implement components mounted to the frame when seeding a field. Reference shall also be made to "forwardly" and "rearwardly" pivotal movement of the seed boot 24 and shovel 22 with respect to their pivotal connection to the supporting drag bar 30 that pulled them along a field during seeding operations. These terms shall refer to the general direction of movement of the shovel 22 and seed boot 24 relative to the remainder of the equipment on mobile frame 10. Thus, as seen in FIG. 1, "forward" pivotal movement of shovel 22 would be viewed as being counterclockwise pivotal movement, and "rearward" movement would be viewed as being clockwise pivotal movement.

Referring to FIG. 1, the frame of a grain seed drill is indicated by reference numeral 10. It includes a downwardly extending rigid standard 12 that rotatably supports a transverse axle 14 for the illustrated planting assembly. The planting assembly includes paired press wheels 16 and 18 which are coaxially fixed to the transverse axle 14.

The paired press wheels 16 are narrowly spaced apart from one another to receive a furrow opener between them. Each furrow opener includes a supporting seed boot 24 and a bottom shovel 22 which forms a slot through the soil as the drill passes along a field area. Seed is directed through the seed boot 24 from a flexible seed delivery tube 26 that leads to a supply hopper 29 mounted on frame 10. An upright seed passage 25 is formed within seed boot 24 to direct seeds from tube 26 to soil in a formed furrow.

The seed boot 24 has a rigid forwardly projecting arm 28 pivoted to the rear end of an associated longitudinal drag bar 30. The general structure of the drill is more fully described in U.S. Pat. No. 3,319,590, which is incorporated by reference into the present disclosure.

Each press wheel includes a solid circular peripheral rim 36 formed about the transverse central axis of the rotating axle 14 to which it is fixed. A coaxial solid circular wall 38 in each press wheel is perpendicular to the central axis and has a diameter smaller than that of the rim. The rim 36 and periphery of circular wall 38 are joined by a solid coaxial conical wall 40. When press wheels 16 are mounted in a pair alongside a furrow opener, the conical walls 40 are inclined outwardly from the overlapped supporting seed boot 24 of the shovel 22 with which the press wheels are associated.

The press wheel structures as described to this point are conventional and have been in widespread use. They effectively pack the side surfaces of a tapered furrow having seed placed at the bottom of the furrow during passage of shovel 22. The packing action of the paired press wheels 16 and 18 maintain the furrow in an open condition, while assuring proper soil coverage above each seed. The deep furrow permits seed to be planted below the moisture line in a field, despite the fact that there might be several inches of dry soil above that line. The deep furrows also concentrate field moisture about the seeds, which is particularly important when planting winter wheat and other grain crops under dry land farming techniques.

As shown in FIG. 1, the individual drag bars 30 are elevationally positioned on the mobile frame 10 by lifting crank assemblies 19. These in turn are manually or hydraulically positioned by a control mechanism, such as the manual ratchet and lever assembly shown at 21. The downward forces exerted on the drag bars 30 by the crank assemblies 19 are directed to the drag bars 30 through an interposed compression spring 20. The purpose of the crank assemblies 19 is to exert downward biasing forces on the drag bars 30 to assure that the shovels 22 operate at the desired subsurface level within moist soil. They also serve to lift the drag bars 30, seed boots 24 and shovels 22 between planting operations. However, since the downward force on the drag bars 30 is applied to shovels 22 through an elongated moment arm extending to the forward pivot connection 31 between each drag bar 30 and the mobile frame 10, the yieldable forces of the compression springs 20 cannot be readily overcome simply due to engagement of an obstruction while pulling shovels 22 forwardly through a field.

The conventional manner of protecting shovels 22 and seed boots 24 from damage or breakage when encountering rocks or other field obstructions is to connect the upper ends of seed boots 24 to the rear ends of drag bars 30 by a frictional pivot connection that normally holds the seed boot 24 in a fixed planting position relative to the drag bar 30. The two are interconnected at a selected location forwardly from the pivot in a selected aperture 27 by a shear pin (not shown) designed to break prior to structural damage to the shovel 22 or seed boot 24. However, once the pin is sheared, the movable seed boot 24 and shovel 22 become practically inoperative until manually reassembled.

The present solution to the problem of field obstructions can best be understood by reference to FIGS. 2, 3 and 7. As shown, a typical longitudinal drag bar 30 includes a pair of side by side members each having forward and rear ends. The transversely spaced forward ends of the drag bar members are pivotally connected to the mobile frame about a common transverse axis that provides the forward pivot connection 31 previously described. The rear ends of the drag bar members straddle and overlap the seed boot arm 28.

A transverse pivot connection 32 is provided between the overlapping rear ends of the drag bar members and the seed boot arm 28 at a location adjacent to the seed boot. The forwardly protruding arm 28, which is fixed to the seed boot 24, extends to the front of the transverse pivot connection 32. It forms a rigid crank arm that moves in unison with seed boot 24 about the transverse pivot connection 32.

A leaf spring 33 has a front end mounted to the drag bar 30. As shown, a front clamp bar 34 is secured transversely across the drag bar members and is bolted to the front end of the leaf spring 33. The rear end of the leaf spring is engageable by the bottom edge of the seed boot arm 28 at a position forward of the transverse pivot connection 32. The engagement of arm 28 by the leaf spring 33 normally biases the seed boot 24 forwardly about the transverse pivot connection 32.

The normal planting positions of shovel 22 and seed boot 24 about transverse pivot connection 32 are defined by a stop 41. Stop 41 is located across the pivotal path of the seed boot arm 28 and defines the preselected planting position of the seed boot 24 while engaged by the arm 28, as shown in FIG. 2. The stop 41 is preferably adjustable to permit the user of the drill to modify the angle of attack of the shovels 22 to match soil, field and seeding conditions. The illustrated stop 41 is pivotally connected to the drag bar 30 by the transverse pivot connection 32 previously described. The angular position of stop 41 about the transverse pivot connection 32 is manually set by adjustment of a nut 42 on a pivoted eye bolt 44 pivotally connected between the drag bar members. Nut 42 is abutted by stop 41. The adjustment nut 42 and eye bolt 39 provide convenient adjustment means operably connecting the drag bar members and stop 41 for selectively fixing the angular position of stop 41 relative to the drag bar 30 about the transverse pivot connection 32.

The assembled leaf spring 33 is bowed downwardly intermediate its ends and extends longitudinally beneath the drag bar members, as can be readily appreciated from FIGS. 2 and 3. It preferably includes spring adjusting means operably connected between the center portion of leaf spring 33 and the drag bar members for varying the force normally biasing the seed boot 24 forwardly about the transverse pivot connection 32. This is shown in FIG. 5 as a transverse center bar 39 attached across the drag bar members and supporting an adjusting bolt 37 that moveably fixes the intermediate portions of leaf spring 33 by means of upper and lower locking nuts.

An arcuate abutment 35 is interposed between the rear end of leaf spring 33 and the seed boot arm 28. Abutment 35 is shown as a bottom arcuate edge protruding from the front end of arm 28 as a smooth extension of its front edge configuration. The continuous curvature of these edges assures smooth engagement between leaf spring 33 and arm 28 at all of its angular positions about the transverse pivot connection 32.

Depending upon expected soil conditions, the rear end of leaf spring 33 can directly engage arm 28 along abutment 35 or there can be a limited amount of free clearance between the abutment 35 and leaf spring 33 when seed boot 24 is in its normal planting position. This latter condition has been found to be particularly advantageous when using the drill under no-till or minimum tillage methods, where the seed boot 24 and shovel 22 work through varying densities of "trash" left in the field by earlier crops.

An adjustable stop, shown as a bolt 43 mounted on the drag bar 30, is interposed between each drag bar assembly and each leaf spring 33 mounted under it. The stop bolt 43 limits the extent of upward movement of the free spring end. Thus, leaf spring 33 can be preloaded upwardly by adjustment of bolt 37, while bolt 43 will limit its upward movement adjacent arm 28, thereby providing limited free clearance (typically 1/16-⅛ inch) between the abutment 35 and the upper surface at the rear end of the associated leaf spring 33. The free clearance allows the seed boots to establish a vibratory back and forth movement about transverse pivot connection 32 that mimics operation of a spring tooth tine and facilitates their passage through the soil and tends to assist in keeping their forward surfaces clear of trash. However, under some soil conditions it is necessary to minimize such vibration, and this also can be accommodated by exerting an appropriate biasing upward force from the leaf spring 33 to abutment 35 and arm 28 while held against stop 41 in its preselected planting position. This can be achieved by raising bolt 43 above the location of leaf spring 33.

Bolt 43 serves a second purpose. It lies in the upward path of the free end of leaf spring 33 when rebounding after clearing a rock or obstruction (FIG. 7). Engagement of bolt 43 minimizes shock loading of arm 28 against its overlying stop 41, and resulting damage to the transverse pivot connection 32 between the drag bar 30 and seed boot 24.

With the present trip mechanism, shovel 22 and seed boot 24 are always free to pivot or swing rearwardly about the transverse pivot connection 32 when hard soil or rocks are encountered. Such movement will be only momentary, and they will be immediately returned to their preselected planting position, defined by the adjustable stop 41, due to the biasing force exerted against arm 28 due to its engagement of leaf spring 33. The return movement of shovel 22 and seed boot 24 requires no manual operation or observation, thereby assuring full field coverage with properly planted seed. The trip mechanism operates independently of the compression forces exerted by springs 20, which are intended to exert proper planting pressure to maintain shovels 22 in moist soil for proper seed germination. Permitting shovel 22 and seed boot 24 to trip independently of the elevational support structure on mobile frame 10 allows the operator to preset the equipment for precise field and soil conditions to both locate the seed at a proper elevation and properly protect the equipment from damage when rocks or other obstructions are encountered.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A seed drill including a mobile frame adapted to be moved longitudinally forward during planting of seed and a seed delivery system having a seed delivery tube with an open lower end through which seeds are directed during planting, the seed drill comprising:

a rigid seed boot having opposed upper and lower ends, the seed boot including an open upright seed passage extending between its upper and lower ends, the seed passage at the upper end of the seed boot being in communication with the lower end of the seed delivery tube, the upper end of the seed boot further including a forwardly protruding arm fixed to the seed boot and having a bottom edge leading to a front edge on the arm;

a shovel at the lower end of the seed boot;

a longitudinal drag bar having forward and rear ends, the forward end of the drag bar being pivotally connected to the mobile frame about a transverse axis, the rear end of the drag bar overlapping the seed boot arm;

a transverse pivot connection mounting the seed boot arm to the rear end of the drag bar;

a longitudinal leaf spring having front and rear ends, the front end of the leaf spring being mounted to the drag bar and its rear end underlying the seed boot arm at a position forward of the transverse pivot connection to bias the seed boot arm upwardly and the seed boot forwardly in a pivotal path about the transverse pivot connection; and adjustable stop means mounted on the drag bar above the seed boot arm for limiting upward movement of the seed boot arm about the transverse pivot connection, the adjustable stop means being engaged by the seed boot arm in response to the biasing action of the leaf spring to define a changeable pre-selected planting position of the seed boot and shovel about the transverse pivot connection;

and arcuate abutment means interposed between the rear end of the leaf spring and the seed boot arm for assuring smooth continuing engagement between them at all operative angular positions of the seed boot and shovel about the transverse pivot connection while the seed boot and shovel are swinging rearwardly about the transverse pivot connection from their pre-selected planting position due to engagement of hard soil or rocks by the forwardly-moving shovel.

2. The seed drill of claim 1 wherein the arcuate abutment means comprises:

a protruding abutment formed at the front end of the seed boot arm, the abutment being continuously curved about the front and bottom edges of the seed boot arm.

3. The seed drill of claim 1 wherein the adjustable stop means comprises:

a movable stop overlying the seed boot arm, the movable stop being pivotally connected to the drag bar about the transverse pivot connection; and adjustable support means operably connected between the drag bar and the movable stop for selectively fixing the position of the movable stop on the drag bar to limit forward movement of the lower end of the seed boot and the shovel about the transverse pivot connection and define the changeable preselected planting position of the seed boot and shovel as it is engaged by the upwardly moving seed boot arm.

4. The seed drill of claim 1 wherein the leaf spring is bowed downwardly intermediate its ends; and spring adjusting means operably connected between the leaf spring and the drag bar for varying the force normally biasing the seed boot forwardly about the transverse pivot connection.

5. The seed drill of claim 1 wherein the leaf spring has a center portion bowed downwardly intermediate the ends of the leaf spring and extending longitudinally beneath the drag bar;

the front end of the leaf spring being fixed to the drag bar at a location adjacent the pivotal connection of the drag bar to the mobile frame; and spring adjusting means operably connected between the center portion of the leaf spring and the drag bar for varying the force normally biasing the seed boot forwardly about the transverse pivot connection.

6. The seed drill of claim 1 wherein the adjustable stop means comprises:

a movable stop overlying the seed boot arm, the movable stop being pivotally connected to the drag bar about the transverse pivot connection;

adjustable support means operably connected between the drag bar and the movable stop for selectively fixing the position of the movable stop on the drag bar to limit forward movement of the lower end of the seed boot and the shovel about the transverse pivot connection and define the changeable preselected planting position of the seed boot and shovel as it is engaged by the upwardly moving seed boot arm;

the movable stop being pivotally connected to the drag bar about the transverse pivot connection and protruding forwardly from the transverse pivot connection in an overlying position above the seed boot arm.

7. A seed drill including a mobile frame adapted to be moved longitudinally forward during planting of seed and a seed delivery system having a seed delivery tube with an open lower end through which seeds are directed during planting, the seed drill comprising:

a rigid seed boot having opposed upper and lower ends, the seed boot including an open upright seed passage extending between its upper and lower ends, the seed passage at the upper end of the seed boot being in communication with the lower end of the seed delivery tube, the upper end of the seed boot further including a forwardly protruding arm fixed to the seed boot and having a bottom edge leading to a front edge on the arm;

a shovel at the lower end of the seed boot;

a longitudinal drag bar having forward and rear ends, the forward end of the drag bar being pivotally connected to the mobile frame about a transverse axis, the rear end of the drag bar overlapping the seed boot arm;

a transverse pivot connection mounting the seed boot arm to the rear end of the drag bar;

a longitudinal leaf spring having front and rear ends, the front end of the leaf spring being mounted to the drag bar and its rear end underlying the seed boot arm at a position forward of the transverse pivot connection to engage and normally bias the seed boot forwardly in a pivotal path about the transverse pivot connection; and adjustable stop means on the drag bar and seed boot arm for defining a changeable pre-selected planting position of the seed boot and shovel about the transverse pivot connection when engaged by the seed boot arm;

the leaf spring having a center section bowed downwardly intermediate its ends and extending longitudinally beneath the drag bar;

and spring adjusting means adjustably connecting the center portion of the leaf spring to the drag bar for varying the force normally biasing the seed boot forwardly about the transverse pivot connection.

8. The seed drill of claim 7 wherein the front end of the leaf spring is fixed to the drag bar at a location adjacent its pivotal connection to the mobile frame.

9. The seed drill of claim 7 further comprising:
arcuate abutment means interposed between the rear end of the leaf spring and the seed boot arm for assuring smooth engagement between them at all operative angular positions of the seed boot and shovel about the transverse pivot connection.

10. The seed drill of claim 7 further comprising:
second adjustable stop means interposed between the drag bar and the leaf spring at a location between the spring adjusting means and the rear end of the spring for limiting upward spring movement relative to the drag bar.

* * * * *